July 10, 1934.  G. C. FAVRE  1,966,030
OPHTHALMIC MOUNTING
Filed Jan. 23, 1930
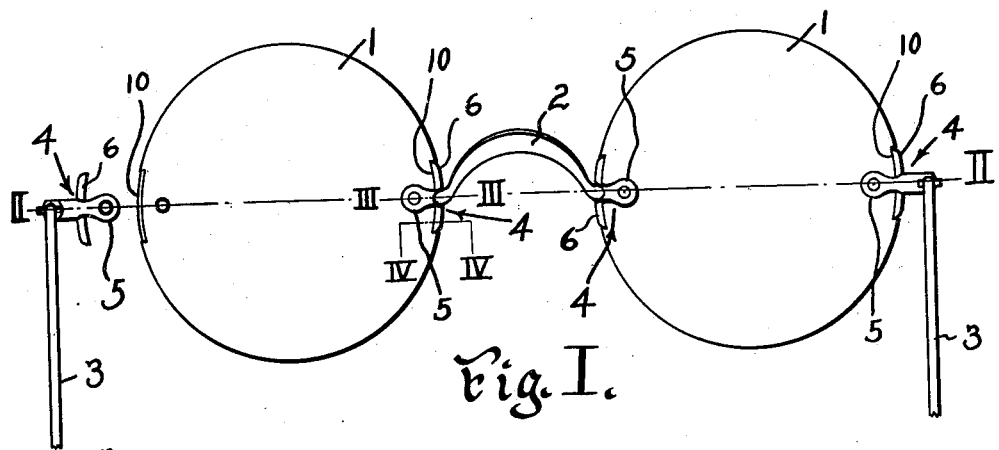
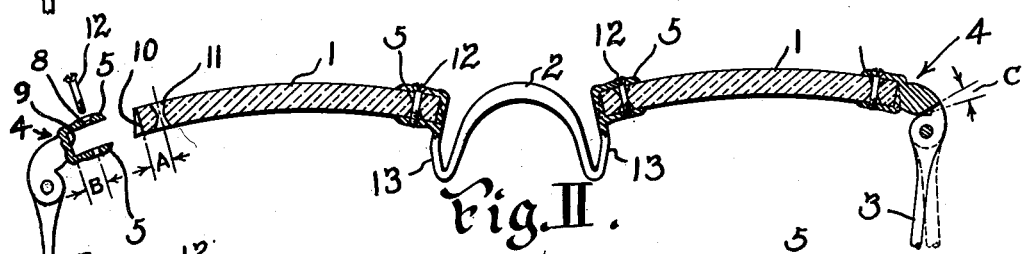
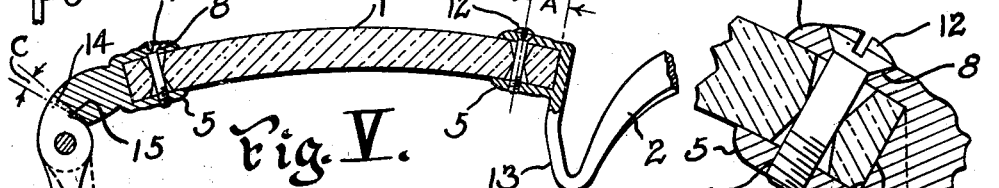
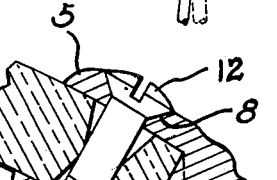
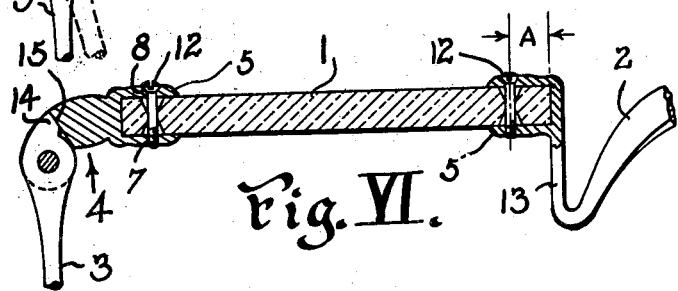
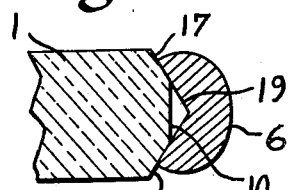
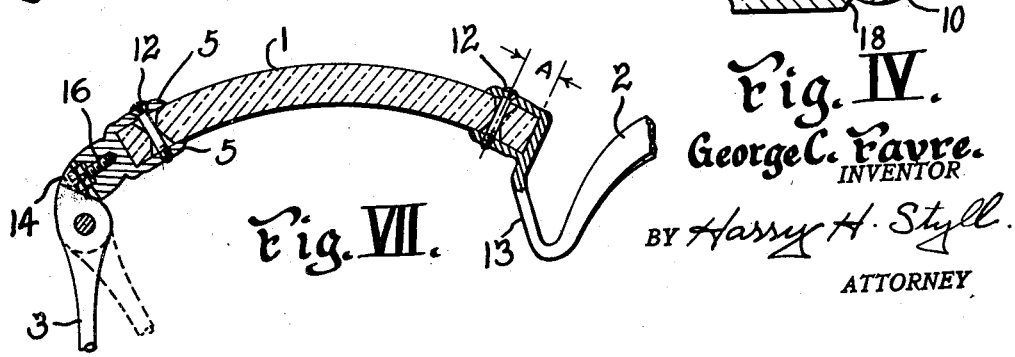
George C. Favre,
INVENTOR
BY Harry H. Styll
ATTORNEY Patented July 10, 1934

1,966,030

UNITED STATES PATENT OFFICE 1,966,030

OPHTHALMIC MOUNTING

George C. Favre, Southbridge, Mass., assignor to American Optical Company, Southbridge, Mass., a voluntary association of Massachusetts Application January 23, 1930, Serial No. 422,772

4 Claims. (Cl. 88—47)

This invention relates to improvements in ophthalmic mountings and has particular reference to improved means for supporting a pair of lenses before the eyes of the wearer, and to an improved process of forming same.

The principal object of the invention is to provide a more secure and accurate fitting lens supporting attachment for an ophthalmic mounting and has particular reference to an improved process of forming same.

Another object of the invention is to provide lens holding means which will be adaptable without alteration to most types of ophthalmic lenses.

Another object of the invention is to eliminate the twisting action of the lens holding or clamp screws in the rimless mountings and the consequent damage to parts.

Another object of the invention is to provide improved means and process of securing the bridge and temple hinge connections to the lenses of a rimless type of mounting.

Another object of the invention is to provide an improved adjustment wherein the lens securing or clamping means may be adjusted to fit various forms of lenses.

Another object of the invention is to provide improved means of truing up and adjusting the mounting to the face of the wearer.

Other objects and advantages will become apparent from the following description taken in connection with the accompanying drawing and it will be apparent that many changes may be made in the details of construction, arrangement of parts and process without departing from the spirit of the invention as expressed in the accompanying claims. I, therefore, do not wish to be limited to the exact details shown and described as the preferred forms only have been shown by way of illustration.

In rimless type mountings, the bridge and temple connections are secured to the lenses by first drilling a hole through the lenses, and securing a clamp member thereon by means of a screw which passes through the hole in the lens.

Since meniscus and toric lenses have gained in popularity, much difficulty has been encountered in providing a satisfactory connection for the lens supporting attachment of the mounting. The main difficulty was that the toric lens after being edged and drilled was greatly different from the flatter or flat lenses in one respect. The axis of the hole and edge of a flat lens are parallel, while in toric lenses, as the edge is perpendicular to a tangent to the mechanical center of the lens, and the hole as drilled by all standard lens drills is perpendicular to a tangent to the curve at the point of drilling, there is a difference in the average lens of approximately 15° in the axis of the hole and the edge of the lens.

A very serious objection to the use of the above mentioned attaching means with the toric type lenses, is that in order to have the lenses both on the same plane with the main body of the mounting, the strap must be angled out approximately 15°. This causes disalignment of the holes in the strap and holes in the lens, which in many instances, prevented the insertion of the screw, and oftentimes caused the breakage of the lens.

Another serious defect was the improper fitting of the parts, and consequent looseness and drooping of the lenses. It is my object to overcome the above defects by providing a hole in the lens, and a seat for the attaching means wherein the axis of the hole, and the edge or bottom of the seat for the attaching means will be parallel at all times, regardless of shape or power of lens.

Referring to the drawing:

Fig. I is a front view of an ophthalmic mounting embodying the invention.

Fig. II is a section on line II—II of Fig. I.

Fig. III is a section on line III—III of Fig. I, greatly enlarged.

Fig. IV is a section on line IV—IV of Fig. I.

Fig. V is an enlarged sectional view illustrating the invention applied to a shallow curved lens.

Fig. VI is an enlarged sectional view similar to Fig. V illustrating the invention applied to a flat lens.

Fig. VII is an enlarged sectional view similar to Fig. V illustrating the invention applied to a deep curved lens.

Referring more particularly to the drawing wherein like characters of reference designate like parts throughout the several views, the device embodying the invention comprises a pair of lenses 1, connected centrally by a bridge member 2 and having attached at their outer ends the temples or ear engaging members 3.

The bridge member 2 and the temple or ear engaging members 3 are attached to the lenses 1 by strap members 4. The strap members 4 are formed from a single piece of material, such as precious or filled metal sheet by blanking or otherwise forming the shape in flat form. The strap 4 is provided with the ears 5 and brace members 6 which are formed during the blanking process. The ears 5 are pierced by drilling or other means, and formed with a screw thread 7 in one hole and a countersink 8 in the other. The strap is then bent to the shape shown in the drawing with the two ear members 5 overlying one another, so that the screw threaded hole and countersunk hole will be in line with each other. The distance B from the center line of the hole in the strap members 5 and the edge contacting face 9, remains constant, regardless of shape of lens to which it is to be fitted.

The lens 1 is next provided with a strap engaging seat 10, which is formed by grinding off a portion of the lens to form a face which lies substantially at right angles to the surfaces of the lens at the outer edge. The screw holes 11 are then drilled in the lens, and are formed substantially parallel to the seat 10. The said screw holes 11 are drilled with a double taper as shown in the drawing the tapering surfaces intersecting substantially midway between the lens surfaces and the widest portions of the opening being at the respective lens surfaces. The distance A from the center line of the hole 11 to the face of the seat 10, is constant, and is equal to the distance B indicated in Fig. II of the drawing. The strap 4 is held on the lens by means of a screw 12 which extends through the hole 11 in the lens and clamps the ear members 5 thereon. It will be noted that when the strap is in this position, the faces 9 and 10 engage each other, and provide a more accurate fit.

Referring to Figures V, VI, and VII it will be noted that the strap 4 is adjusted to the curves of the various lenses by bending the arm 13 at the bridge connection. The temple 3 may be adjusted for its proper set back, by filing off the strap engaging projection 14, as shown at C in Fig. 5. A suitable seat 15 is formed on the strap 4, to provide an engaging face for the projection 14, to hold the temple in proper position.

A slight modification of the adjustment of the set back of the temple is shown in Fig. VII wherein, instead of filing the projection 14, a screw is provided. The head of the screw 16 forms a contact for the projection 14, and is adjustable in and out to control the position of the temple.

In Fig. IV, there is shown a slight modification taken as on line IV—IV of Fig. I, which shows the seat 10 as being provided with beveled faces 17 and 18. These beveled faces are adapted to fit within a bevel 19 formed in the brace member 6, the purpose of which is to prevent twisting of the braces on the lens. The groove 19 is formed by striking the brace member 6 with a groove forming die, after the lens connecting member 4 is assembled. This groove is not only adapted to prevent twisting of the lens in the connecting member when assembled, but also forms a more rigid and durable brace member. The grooving process tends to add more strength to the brace member, and prevent bending thereof, when in use.

In Figures V, VI, and VII, I have shown another slight modification wherein the entire periphery of the lens is edged at an angle to the axis line on the lens, instead of just a restricted portion 10. The lens is edged substantially on a radial line of the center of curvature of the outer curve of the lens, or on a line normal to the tangent of the outer curve at the periphery of the lens.

The lens connecting means on the bridge is adjusted to the curve of the lens by bending the shank 13 as shown in Figs. V, VI, and VII of the drawing. The temple connection is secured in position at the outer edge of the lens, and the set back of the temples is properly adjusted by filing off a portion of the projection 14 as shown at C in Fig. V, or by adjustment of the screw 16, as previously described. In view of the fact that the distance B, illustrated in Fig. II is constant, and the distance A is constant, a more rigid and uniform fit is obtained throughout all lenses. The screw holes are always in alignment, and the screw may easily be inserted in position. The screw may be tightened to rigidly unite the parts without danger of straining and breaking the lenses. When the mounting is assembled, there is no loose play at the bridge or temple connection; the accurate fit of the lens connecting members forms a more rigid and durable mounting.

From the foregoing it will be seen that I have provided means to carry out all the objects of the invention in a simple, economical and efficient manner, especially in providing improved means for supporting rimless lenses of varying curvatures without fear of breakage and an improved process of forming same.

Having described my invention, I claim:

1. In a device of the character described, a lens having its edges substantially radial with the main curvature of the lens and having perforations therethrough adjacent the edge on the nasal side thereof, the axis of said perforation being substantially parallel with the edge of the lens and said opening having a double taper with the intersection of the tapering surfaces substantially midway the surfaces of the lens, and a lens holding member comprising an edge portion and ear portions engaging the edge and surfaces respectively of the lens and having openings aligned with the opening in the lens and a securing member extending through the openings in the lens holding means and lens to hold the parts together, said edge portion of the lens holding member being recessed substantially midway of the surfaces of the lens and the edge of the lens engaging said edge portion and the inner surface of the edge portion so engaged having a double taper, the planes of the tapered surfaces intersecting substantially midway of the surfaces of the lens.

2. In a device of the character described, the combination of a lens having a peripheral edge surface which lies substantially parallel with the axis of the lens throughout the major portion of the edge and which has a connecting set thereon, the outer surface of which lies substantially on a radial line of a curve on the lens regardless of the radius of said curve, said lens having a perforation therein adjacent the seat, the axis of said peforation lying substantially parallel with the surface of the seat and lying at an angle to the edge of the lens adjacent the seat and a lens holding member comprising an edge portion and ear portions engaging the edge and surfaces respectively of the lens and having openings aligned with the perforation in the lens and a securing member extending through the openings in the lens holding means and lens to hold the parts together.

3. In a device of the character described, the combination of a lens having a peripheral edge surface which lies substantially parallel with the axis of the lens throughout the major portion of the edge and which has a connecting seat thereon, the outer surface of which lies substantially on a radial line of a curve on the lens regardless of the radius of said curve, said seat having tapered edges, the said lens having a perforation therein adjacent the seat, the axis of said perforation lying substantially parallel with the outer surface of the seat, and lying at an angle to the edge of the lens adjacent the seat, and a lens holding member having a V-shaped lens engaging portion engaging the tapered connecting seat and means for securing the holding member to the lens.

4. A device of the character described comprising the combination of an ophthalmic lens having an edge the plane of which is at an angle to the surfaces of the lens and a seat portion on said edge the plane of which is substantially radial with a face surface on the lens and at an angle to the plane of said edge and a lens holding member having a seat portion engaging the seat portion of the edge of the lens and a portion engaging a face of the lens, and means securing the face engaging portion of the lens holding means and the lens together.

GEORGE C. FAVRE.